United States Patent
Gehrling et al.

(10) Patent No.: US 10,080,101 B2
(45) Date of Patent: Sep. 18, 2018

(54) DEVICE, METHOD, AND COMPUTER PROGRAM FOR GROUPING DEVICES BY LOCATION

(71) Applicant: VOLKSWAGEN AG, Wolfsburg (DE)

(72) Inventors: Sebastian Gehrling, Essen (DE); Jens Kampermann, Haan (DE); Klaus Meierling, Bochum (DE); Matthias Mohaupt, Bochum (DE); Gerd Penshorn, Edemissen (DE); Henning Taschke, Bochum (DE); Wolfgang Theimer, Bochum (DE); Ernst Zielinski, Bochum (DE)

(73) Assignee: VOLKSWAGEN AG, Wolfsburg (DE)

( * ) Notice: Subject to any disclaimer, the term of this patent is extended or adjusted under 35 U.S.C. 154(b) by 0 days.

(21) Appl. No.: 15/454,017

(22) Filed: Mar. 9, 2017

(65) Prior Publication Data

US 2017/0280284 A1 Sep. 28, 2017

(30) Foreign Application Priority Data

Mar. 24, 2016 (DE) .................. 10 2016 204 996

(51) Int. Cl.
*H04W 4/02* (2018.01)
*H04W 4/021* (2018.01)
*H04B 1/3822* (2015.01)
*H04W 76/14* (2018.01)

(52) U.S. Cl.
CPC .......... *H04W 4/021* (2013.01); *H04B 1/3822* (2013.01); *H04W 76/14* (2018.02)

(58) Field of Classification Search
CPC ............................................. H04W 4/02–4/08
USPC ............................................. 455/456.1–457
See application file for complete search history.

(56) References Cited

U.S. PATENT DOCUMENTS

| | | | |
|---|---|---|---|
| 2005/0172001 A1 | 8/2005 | Zaner et al. | |
| 2008/0042912 A1 | 2/2008 | Lee | |
| 2014/0364151 A1 | 12/2014 | Schiff | |
| 2015/0222680 A1* | 8/2015 | Grover | ............... H04L 65/4084 709/204 |
| 2015/0256669 A1 | 9/2015 | James et al. | |

FOREIGN PATENT DOCUMENTS

| | | |
|---|---|---|
| CA | 2742271 A1 | 12/2011 |
| DE | 10225550 A1 | 12/2003 |
| DE | 102013203226 A1 | 8/2014 |
| DE | 102013016850 A1 | 4/2015 |

(Continued)

*Primary Examiner* — Allahyar Kasraian
(74) *Attorney, Agent, or Firm* — Barnes & Thornburg LLP (57) ABSTRACT

The method simplifies the formation of groups of devices in secure spaces. Such spaces may be passenger compartments of vehicles, and the passenger compartments can additionally be partitioned into zones. Each zone can be allocated a group. For instance, driver and front-seat passenger can be allocated to one group. The travelers in the rear seat-rows can be allocated to another group. This allows data exchange with driver and front-seat passenger that relates to the vehicle route or even relates to vehicle assistance systems. The other group, for instance, children travelling in the vehicle, can share other data, for instance, for entertainment purposes. The acceptance of systems offered in the vehicle can be increased by simple group formation.

12 Claims, 4 Drawing Sheets

(56) References Cited

FOREIGN PATENT DOCUMENTS

| EP | 2728914 A1 | 5/2014 |
| KR | 20140136068 A | 11/2014 |
| KR | 1569022 | 11/2015 |
| WO | 2013074919 A2 | 5/2013 |
| WO | 2015066692 A2 | 5/2015 |

* cited by examiner

DEVICE, METHOD, AND COMPUTER PROGRAM FOR GROUPING DEVICES BY LOCATION

PRIORITY CLAIM

This patent application claims priority to German Patent Application No. 10 2016 204 996.8, filed 24 Mar. 2016, the disclosure of which is incorporated herein by reference in its entirety.

SUMMARY

Illustrative embodiments relate generally to forming groups of devices by position-finding and specifically to forming groups of devices by position-finding within a moveable spatial region.

BRIEF DESCRIPTION OF THE DRAWINGS

Some exemplary embodiments are explained in greater detail below with reference to the accompanying figures, in which.

DETAILED DESCRIPTION

In social networks and also in the private and professional context, it is common practice to exchange information with communications partners. In many of these cases, it is important that the information reaches only the people intended because the data is confidential or highly personal. Establishing trusted communication is often based on the exchange of credentials, which the parties enter and, if applicable, exchange with one another. Groups of communications partners with whom information can be shared easily are thereby formed. This sharing of information can be performed, for example, by sending new messages automatically to all members of the group. Although this method is secure, it is not very spontaneous and requires prior user actions to set up, maintain and disband such groups. This may include entering login data, for example.

DE 10 2013 203 226 A1, for example, describes a communication means (e.g., chat messages) between two personal electronic devices (PEDs) associated with different seats in an aircraft.

A vehicle is a personal space offering privacy away from the public domain. It is hence obvious to use the properties of this space also for establishing spontaneous yet nonetheless secure communication. A concept designed to fit this scenario is presented below. US 2015/0256669A1 discloses a method for reducing distraction in which the location of a mobile device, e.g., a smartphone, within a zone inside a vehicle is determined, and the behavior of the mobile device is modified according to the zone.

Automatic interconnection of two mobile stations is known. This can be done, for example, by means of near-field communication (NFC) technology, with which mobile stations are held directly against one another. It is thereby possible to exchange data spontaneously between two devices that have (almost) touched each other at least once.

It is also possible to interconnect Bluetooth devices (for instance headsets) automatically without performing a security check. This technique is very insecure, however, because the communications partner is not verified. Thus third parties can easily establish an interconnection of this type without authorization.

In the outlined solutions, however, is that in the case of NFC, operation is constrained to the devices being brought into direct contact. Another shortcoming can be dispensing with authorization of the interconnection by the user. For instance, Bluetooth has the automatic interconnection mode known as "just work". In this case, third parties can actually make unauthorized and unwanted interconnections. The two interconnection procedures mentioned (NFC and Bluetooth) constitute connections between two devices, also known as pairing. Another problem is that forming larger groups cannot be achieved, or cannot be achieved easily, using the techniques mentioned. For instance, pairing can only be performed successively with different partners, which increases complexity.

It would therefore be desirable to make it easier to form groups of devices within defined environments.

Disclosed embodiments provide a device, a method and a computer program.

Disclosed embodiments provide a method for data transmission between at least two mobile stations over an air interface. The method comprises identifying at least two mobile stations that are present within a moveable spatial region. The method also comprises verifying whether the at least two mobile stations are located within a localized zone of the moveable spatial region. In addition, the method comprises interconnecting for the purpose of data transfer the at least two mobile stations if the positions of the at least two mobile stations lie within the localized zone of the moveable spatial region.

In this context, data transmission fundamentally refers to all methods that communicate the (user) information from a transmitter (information source) to a receiver (information sink). In the use presented here, this is done by the transmitter varying over time a physical parameter (for example, voltage or the frequency of electromagnetic waves), and the receiver then measuring the parameter. Technical transmission techniques are known, for example, for alphabetic texts, for transmitting moving or stationary images, for transmitting voice and/or music, and are used in many different ways by commercially available mobile stations.

Mobile stations, also known as mobile terminal equipment or mobile devices, are items of terminal equipment that are small enough and light enough to be carried without major physical strain and thus can be used on the move. They may be electronic terminal equipment for mobile, typically network-independent, applications for data, voice and/or image communication and/or navigation. The term "terminal equipment" is used here solely in the sense defined in information and communications technology.

In everyday language, mobile stations include mobile phones (for instance smartphones), tablet computers and personal digital assistants (PDAs). A feature of such mobile stations is the availability of data for personal information regardless of location. Often applications can be used that are also usable on fixed terminal equipment. In addition, simultaneous use of radio services, mobile communications services (GSM (global system for mobile communications)), GPRS (general packet radio service), UMTS (universal mobile telecommunications system), EDGE (enhanced data rates for GSM evolution)) and other telecommunications services may be possible. This can also include provision of WLAN (wireless local area network) and/or Bluetooth and/or NFC (near field communication) and/or UWB (ultra-wideband technology, approximately 3-10 Gigahertz) communications facilities.

Notebooks and sub-notebooks can also be classed as mobile stations. Mobile stations also include GPS devices and other portable satellite communications interface devices. In addition to the commercially available mobile stations produced for the consumer market there are also numerous custom products that have been created for specific applications.

The term "air interface" denotes the transmission of data by means of electromagnetic waves, so ostensibly through the medium of "air". In fact these waves also work in a vacuum. The feature of the air interface is that transmission takes place wirelessly.

Moveable spatial regions include moveable spaces. In this context, a space is characterized as moveable if it can move in a reference system. For instance, all vehicles, aircraft and ships move over the Earth as the reference system. In addition, these means of transport and also possible other objects also comprise spatial regions, spaces for short, that may be passenger compartments or a passenger area. Such passenger compartments can be embodied as enclosed spaces, such as is the case for an aircraft, for example. They can also be open in design, however, as is the case for a convertible with the roof down or the outdoor area on a ship, for example.

Movable spatial regions can also comprise localized zones. The largest localized zone of a movable spatial region is in this case the entire movable spatial region. The smallest localized zone is a position for at least one person including the mobile stations of the at least one person. A plurality of people can be present in this smallest localized zone at successive points in time, something that may figure in fleet management, which is explained later. The localized zones can also include intermediate sizes. The localized zones are located in movable spatial regions. The movable spatial region is taken to be the reference system. The localized zone thus has a fixed position in the movable spatial region. In other words it is arranged immovably in the movable spatial region.

Verifying whether the at least two mobile stations are located within a localized zone of the movable spatial region comprises determining the position of the at least two mobile stations. Determining the position is understood to mean generally finding the location or position of an object, for example, of a mobile station. This process can involve determining the position of the mobile station from the field strength measurements at antennas arranged, for example, in a passenger compartment. In this case, the receive direction of the signal can be found using an antenna, for example, a dual-antenna array, and using adjustable phase shifters. To find the receive direction, the signals received by the two antennas of the antenna array can be shifted with respect to one another in n operations (for instance n=8, n=16) and then summated. The receive direction can be estimated from the signal strength of the summated signal. This direction corresponds to the direction associated with the strongest summation signal (best antenna lobe). The location of the sought device can be determined even using just one antenna given certain spatial conditions, if applicable with the aid of the spatial geometry of the movable space. When using a plurality of antennas, the location of the sought device can be determined from a plurality of direction estimates. The intersection of the "best" antenna lobes (beams) of the individual antenna arrays gives an estimate of the position.

The position can be determined to different levels of accuracy depending on the technical capabilities and intended use. For instance, the position-finding can give a range in which the mobile station is located. This range can be a line segment on which the mobile station is located within the movable space. In addition, the position can be determined almost to pinpoint accuracy. The position is always determined with respect to a reference system. The reference system that is relevant in the present context is, for example, the passenger compartment, more generally the movable spatial region.

Alternatives for determining the position can include trigonometric techniques and/or linear algebra techniques. These techniques can be used to find the position of the mobile device from the determined receive directions of the antennas and the known distances between the antennas.

Linear algebra is a branch of mathematics concerned with vector spaces and linear mappings between these spaces. One of its uses is the mathematical description of geometric objects, i.e., the mathematical description of the 2-dimensional and 3-dimensional (Euclidean) space.

Linear algebra can accordingly also be used to find the position of the mobile device using the determined receive directions of the antennas and the known separations between the antennas.

Interconnecting the at least two mobile stations for the purpose of data transfer if the position of the at least two mobile stations lies within the localized zone of the movable spatial region comprises saving relevant interconnection data. This data can be saved in the mobile stations themselves. Walkie-talkie mode or even handheld radio mode, which operates directly between the mobile stations, can accordingly be supported. The interconnection data can also be saved in an interconnection device, which can be assigned to the movable spatial region, which may be a passenger compartment, for instance. The interconnection device can accordingly control the data transmission and/or be incorporated in the data transmission.

The interconnection data can also be saved in external servers however, which themselves can support applications that require interconnection processes for the purpose of forming groups. Such applications can be downloaded to mobile stations as "apps". For instance, an app can be embodied as what is known as a messenger app—a mobile message app—which allows the exchange of messages. The messenger app may be available for iPhone, BlackBerry, Windows phone, Android and Nokia mobile stations. Messenger-app users can form groups and send images, video files and audio files to one another practically without limits.

Interconnecting can also comprise the identification and mutual authentication of the mobile stations involved and the interconnection device and, if applicable, the server.

Forming the group can be simplified by replacing interconnection information to be entered by users with data and positions from the spatial positioning.

Disclosed embodiments simplify in spaces that are secure the formation of groups of the devices located therein. Such spaces may be passenger compartments of vehicles. Furthermore, the passenger compartments can additionally be partitioned into zones. Each zone can be allocated a group. For instance, driver and front-seat passenger can be allocated to one group. The travelers in rear seat-rows can be allocated to another group. This allows, for example, data exchange with driver and front-seat passenger that relates to the vehicle route or even relates to vehicle assistance systems. The other group, for instance children travelling in the vehicle, can share other data, for instance for entertainment purposes. The acceptance of systems offered in the vehicle can be increased by simple group formation.

At least some of the data transmission can optionally take place directly between the mobile stations.

Once interconnection has been performed, the actual data transmission can take place, for example, in walkie-talkie mode, as already mentioned. Bluetooth can be used here besides DECT, UWB or other techniques for data transmission. The interconnection data is prepared according to the specific technique, dispensing with the associated preceding interconnection operation in the techniques and allowing data transmission to proceed securely in the group.

It is thus possible to dispense with the interconnection, which is specific to the data transmission, absolving the user from knowing a plurality of procedures and their implementation.

In exemplary embodiments, only one mobile station at a time can be connected to an interconnection device.

An interconnection device is used to interconnect the at least two mobile stations. Data from identified and verified mobile stations can be disclosed to this device. This data can comprise parameters for interconnection and/or parameters for data transmission techniques available in the mobile stations and/or parameters of user requirements. To obtain this data, the interconnection device makes contact with the identified and verified mobile stations. In this context, applications (apps) that are used to perform, amongst other functions, communication with the interconnection device can be downloaded to the mobile stations. The known data transmission techniques can be used here for communication, as already mentioned. For instance, Bluetooth or other short-range transmission techniques can be used. It may be necessary to perform in advance an interconnection between mobile station and interconnection device, which the app downloaded to the mobile station can execute automatically. The app can also include the identification and authentication of the devices to be interconnected.

If the interconnection device is itself responsible for the interconnection of the mobile stations, it stores the relevant interconnection data itself. In this case, one set of interconnection data can be generated and stored for each localized zone. If the interconnection device is not responsible itself for the interconnection, for instance because the interconnection is performed directly by the mobile stations, it transmits the interconnection data to the mobile stations. In this case, it adapts the interconnection data to the circumstances of the mobile stations, which may be defined, for example, by operating systems used in the mobile stations. If the interconnection is performed by external applications, for example, by what are known as messenger apps, the interconnection device transmits the data in accordance with the requirements in these applications.

If just one mobile station at a time is connected to the interconnection device, this interconnection device additionally comprises a data memory. This stores the data received from a mobile station for transfer to a second mobile station at a later time. Such a procedure can be beneficial in the field of fleet management, for example.

Drivers of utility vehicles often would like to leave messages for their replacements, who they may not know by name, concerning the vehicle or details of a job. They can leave this information in the vehicle once their mobile station has been added automatically to the group of the vehicle. The next driver then receives this information when he likewise has been added automatically by his mobile device to the group of the vehicle. Again in this case, pinpointing the position inside the localized zone, which is of a size for one person, is important that only the driver receives this information (using his mobile device in the driver's seat).

This achieves a simple transfer of information without this information being accessible to third parties.

At least some of the data transmission can optionally take place via an interconnection device assigned to the movable spatial region.

The interconnection device can be assigned to the movable spatial region. This can be done by positioning the interconnection station in, or in the vicinity of, the movable spatial region. For instance, the interconnection device can be positioned in a passenger compartment of a vehicle. It can also be implemented in a remote server, however. In this case, apart from the antenna for receiving radio signals, the passenger compartment can comprise solely a transmission means, which establishes the connection to the remote server. Alternatively, a central interconnection device can also be provided, which performs all the interconnections centrally.

The data transmission via the interconnection device can be encrypted, for example, in which case different keys can be used in transmitter and receiver of the mobile stations.

Finally, data of the data transmission can also be transferred by the interconnection device to remote nodes and/or services. In this sense, the interconnection device is also able to exchange additional data with partners outside the group of the interconnected devices.

Incorporating the interconnection device can thus impede unauthorized access to the data transmission. In addition, it is hence possible to integrate applications from the vehicle manufacturer or other applications, which can become part of the data transmission by means of the interconnection device.

In exemplary embodiments, the data of the data transmission can be stored in an interconnection device and/or in a control center assigned to the interconnection device.

Central data storage can be beneficial in the case of fleet management and the associated storage of user data from a mobile station for transfer to a second mobile station. This data storage can also have a failsafe design, for instance to prevent a power failure resulting in a loss of data. Thus the reliability can be increased in the event that servicing work is being carried out at the time of driver changeover. At the same time, it is easier to protect the centrally stored data from improper access.

This can hence impede unauthorized access to the data to be exchanged between the mobile stations.

The movable spatial region can optionally comprise a passenger compartment of a vehicle or comprise a cabin of an aircraft. In addition, the localized zone of the movable spatial region can comprise seats or seat areas in the passenger compartment or in the cabin.

Passenger compartments are located in all vehicles other than self-driving cars. They include at least the space for the driver and optionally also a space for fellow passengers. Typical passenger compartments for land vehicles are those in cars, motorhomes, heavy goods vehicles and buses. In addition, however, ships and trains in general have passenger compartments, the design of which is characteristic of the means of transport. Likewise, aircraft cabins can be included because, in terms of features essential to the disclosed embodiments, they do not differ from the other passenger compartments already mentioned.

In a movable spatial region embodied as a passenger compartment of a vehicle, the seating arrangement can define the localized zones. For instance, driver and front-seat passenger and their immediate environment can define a localized zone.

The entire movable spatial region can be considered to be a zone, for example, which is useful for small passenger compartments such as in a two-seater vehicle.

In exemplary embodiments, at least two localized zones can be arranged within the movable spatial region.

Movable spatial regions are not restricted to one localized zone. Thus one or more additional localized zones can include the seats of one or more rear seat-rows in the passenger compartment. Zones can also overlap, in which case mobile stations in a plurality of zones can exchange data with the associated mobile stations in all the zones involved. The theoretical number of localized zones is only limited by partitioning of the movable spatial region in practice. The same applies to the aforementioned aircraft cabins.

Thus passenger compartments can be partitioned in a way that allows allocation to individual groups, for instance driver and passengers.

Optionally, the interconnection can be activated without confirmation or by manual confirmation.

Both the automatic, unconfirmed interconnection and the manual confirmation of the interconnection may be desirable. The type of interconnection required can be stored in the mobile stations. For instance, an installation menu can request this parameter when the application for interconnection is installed. The required form of the request can also be stored in the interconnection device, however. If manual confirmation is stored, a user prompt containing the option for manual control of the interconnection can appear on the display unit of the mobile station concerned. For the case of automatic interconnection, no prompt is made.

The user can thereby prevent unwanted group formation.

In exemplary embodiments, identification amongst the at least two mobile stations can take place immediately at the time of interconnection or not until a clearance operation.

For relatively large movable spatial regions, for instance in a passenger compartment of a coach, identification of the mobile station to be interconnected can be desirable before the interconnection. In the same way as the manual interconnection confirmation, the installation of an interconnection app can be used to request and store an appropriate parameter. The parameter can be stored in the mobile station and/or in the interconnection device. In the case that identification is required, a user prompt is made at the mobile station in a similar way to the manual interconnection confirmation.

Thus the interconnection can be restricted to those mobile stations that are wanted.

Optionally, the interconnection period between the at least two mobile stations can be linked to the presence of the at least two mobile stations within the localized zone of the movable spatial region. It is also possible to link the interconnection period to an expiry date. In addition, the interconnection period can be linked to an evaluation of previous interconnections. It is also possible to take into account a plurality of the parameters to determine the interconnection period.

The interconnection device can regularly check that the interconnected mobile stations are present in the localized zone, for instance can check every 5 seconds. If the interconnection device establishes that a mobile station has left the localized zone, it can remove this mobile station from the group. Optionally, a suitable signal, which can activate a suitable user notification, can be transmitted to the remaining mobile stations in the group. Additionally or alternatively, the interconnection device can disband the group at an expiry date, for instance after one hour. Additionally or alternatively, for the purpose of disbanding the group or for excluding a mobile station from the group, the interconnection device can take account of data from previous interconnections of the mobile station.

Thus maintaining the group for too long can be avoided by automatic disbanding.

According to another disclosed embodiment, a computer program is proposed. The computer program is stored on a storage medium for the purpose of executing the method operations according to any of the previous claims. Execution takes place in a processor or in hardware that is otherwise programmable.

Thus method operations can be modified without modifying the processor or the programmable hardware.

According to another disclosed embodiment, a device is proposed for data transmission between at least two mobile stations over an air interface. This device comprises an identification processor, which is designed to identify at least two mobile stations that are present within a movable spatial region. The device also comprises a verification processor, which is designed to verify whether the at least two mobile stations are located within a localized zone of the movable spatial region. In addition, the device comprises an interconnection processor, which is designed to interconnect for the purpose of data transmission the at least two mobile stations if the positions of the at least two mobile stations lie within the localized zone of the moveable spatial region.

Forming the group can be simplified by replacing interconnection information to be entered by users with data and positions from the spatial positioning.

According to another disclosed embodiment, a mobile station is proposed for connecting to at least one second mobile station over an air interface by means of an interconnection device. The mobile station comprises an application processor, which is designed to communicate with the interconnection device for acquiring the position of the mobile station. The mobile station also comprises an interconnection processor, which is connected to the application processor and is designed for data transmission with a second mobile station in the event that the positions of the at least two mobile stations lie within a localized zone of a moveable spatial region.

The mobile station can optionally comprise a memory for an application, which memory is responsible for controlling the application processor and the interconnection processor. This application can be downloaded to the mobile station from the Internet and installed. It can access the resources of the mobile station via a standard interface and is in data communication with the interconnection device. Moreover, an identification processor located in the mobile station can also be used for mutual identification of mobile station and interconnection device. In addition, an authentication processor located in the mobile station can also be used for mutual authentication of the devices. The authentication processor may also be located in a secure area of the mobile station, for example, in a smart card, which may be a SIM (Subscriber Identity Module).

Various exemplary embodiments are now described in more detail with reference to the accompanying drawings, which show some exemplary embodiments. For the sake of clarity, the thicknesses of lines, layers and/or regions may be shown exaggerated in the figures.

In the description below of the accompanying figures, which show just some exemplary embodiments by way of example, the same reference numbers may denote identical or similar components. In addition, collective reference numbers can be used for components and objects that appear more than once in an exemplary embodiment or in a drawing but are described jointly in terms of one or more features. Components or objects denoted by the same or collective reference numbers may be identical in design but may also differ in design with regard to one or more features or all the features, for instance with regard to their dimensions, unless explicitly stated or implied otherwise in the description.

Although exemplary embodiments can be modified and altered in various ways, exemplary embodiments are shown in the figures by way of example and are described in detail in this document. It should be made clear, however, that the intention is not to limit exemplary embodiments to the forms disclosed in each case but instead the exemplary embodiments are intended to cover all the functional and/or structural modifications, equivalents and alternatives within the scope of the disclosed embodiments. The same reference numbers are used throughout the description of the figures to donate identical or similar elements.

The terminology used in this document serves only to describe certain exemplary embodiments and is not intended to restrict the exemplary embodiments. The use in this document of singular forms is intended to include also the plural forms, provided the context does not clearly indicate otherwise. It should also be made clear that expressions such as "contains", "containing", "comprises" and/or "comprising" as used in this document indicate the presence of specified features, whole numbers, operations, procedures, elements and/or components but does not exclude the existence or addition of one or more features, whole numbers, operations, procedures, elements, components and/or groups thereof.

Figure 1:
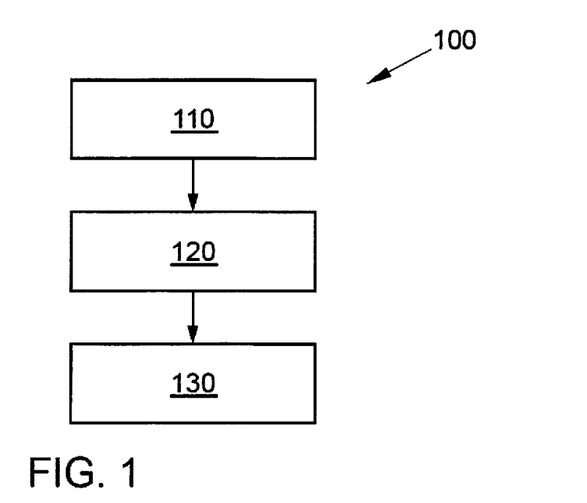
FIG. 1 shows a method of a first exemplary embodiment.

FIG. 1 shows a method of a first exemplary embodiment. It shows a method for data transmission 100 comprising the following operations: operation at 110 shows identifying at least two mobile stations that are present within a movable spatial region, for instance in a passenger compartment. For this purpose, in operation at 110, mobile stations are located for instance by using the movement of the passenger compartment and thus the vehicle movement to identify the mobile stations. For instance, when the vehicle is moving and the current position is known, a mobile station that can be permanently received is highly likely to be located in the passenger compartment. Alternatively, the mobile stations can already be connected to the vehicle. For example, the mobile stations may be connected to an interconnection device of the vehicle, which device is embodied as an infotainment system, and in this case additionally have stored an identification of the mobile station in the vehicle. This connection can exist by means of the Bluetooth standard, for example. Approximate position data can also be transmitted in this case from the mobile stations to the infotainment system for comparison with the position of the vehicle. In addition, the field strength of the radio signals emitted by the mobile stations can also be included in the identification. Hence there are a multiplicity of techniques available that can be used alternatively or even in association to identify the mobile stations within the movable spatial region.

There are two different cases here. In the first case, the at least two mobile stations are located simultaneously within the movable spatial region. In the second case, the at least two mobile stations are located within the movable spatial region at different times. For instance in the first case, games can be played using the interconnected mobile stations, which allow rapid interaction between the mobile stations. In the second case, messages can be transferred. For example, for utility vehicles, messages can be transferred to drivers who are not known to one another by name. Accordingly, identification in the second case requires only a single mobile station to be present at a time. If then the second mobile station arrives at a later time, operation at 110 is repeated. If at least one mobile station at a time is identified in the passenger compartment, the method branches to operation at 120. If at least two mobile stations are located within the movable spatial region (case 1), operation at 110 is extended to all the mobile stations present.

Operation at 120 verifies whether the at least two mobile stations within the movable spatial region are also located within a localized zone of this movable spatial region. This can be done, for example, by checking their position more accurately. Suitable techniques for this purpose have already been described and include, for example, directional measurement of field strength by means of radio signals received by antenna arrays. A plurality of antenna arrays can be included here. The position can be saved in a memory, for instance in a memory arranged in an interconnection device, which may also be embodied as an infotainment system. If at least one mobile station at a time is located in the localized zone (case 2), the method branches to operation at 130. For a second mobile station, the operation at 120 is then repeated at a later time. If at least two mobile stations are located within the localized zone (case 1), operation at 120 is extended to all the mobile stations present.

In operation at 130, the at least two mobile stations are interconnected. For instance, the interconnection data of an application (if applicable, app) of the mobile stations is exchanged by means of the interconnection device connected to the mobile stations. In case 1, data transmission between the interconnected mobile stations is subsequently possible. In case 2, an interconnection, for example, a semi-interconnection, is already made once a mobile station is present. This semi-interconnection is used to acquire relevant data from the mobile station (identity, interconnection parameters) and to transmit and store the user data that is meant to be transferred to the second mobile station. When the second mobile station is present at a later time, the semi-interconnection is converted into a (full) interconnection. The user data is then transmitted to the second mobile station.

Figure 2:
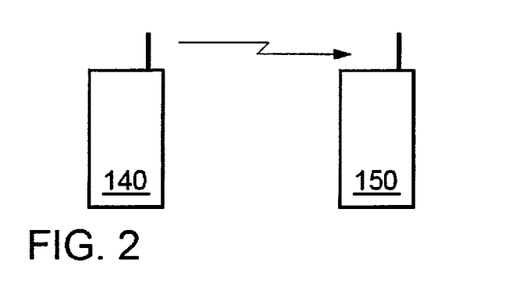
FIG. 2 shows an implementation of the first exemplary embodiment.

FIG. 2 shows an implementation of the first exemplary embodiment. In this case, at least some of the data transmission takes place directly between the mobile stations 140 and 150. For instance this can be performed by Bluetooth or WLAN connection, which can each provide an interconnection procedure before the actual data transfer. The interconnection procedure can be performed here by the interconnection device to which both mobile stations are connected. A walkie-talkie function, for example, can then operate between the mobile stations after the interconnection.

Figure 3:
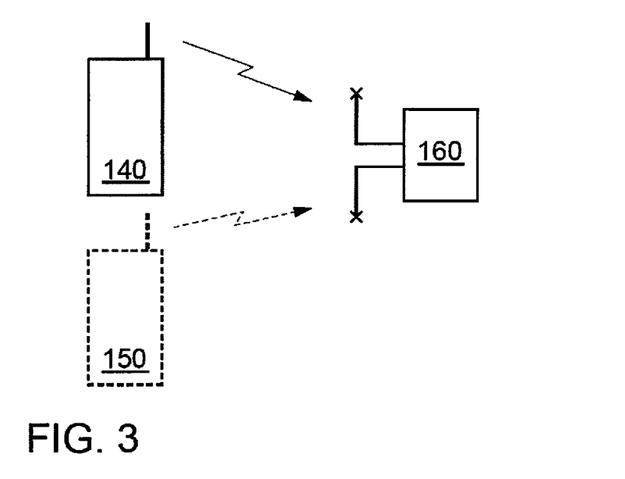
FIG. 3 shows another implementation of the first exemplary embodiment.

FIG. 3 shows another implementation of the first exemplary embodiment. In this case, only one of the two mobile stations 140 and 150 to be interconnected can be located in the localized zone at a time. This corresponds to the aforementioned case 2. A message transfer can thus take place at least from the mobile station present earlier to the mobile station present later.

Figure 4:
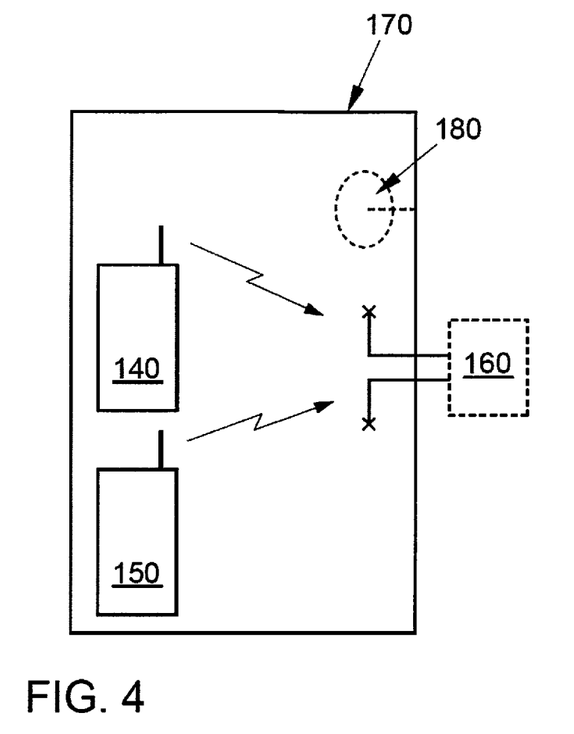
FIG. 4 shows another implementation of the first exemplary embodiment.

FIG. 4 shows another implementation of the first exemplary embodiment. In this case, at least some of the data transmission takes place via an interconnection device 160 assigned to the movable spatial region 170. The movable spatial region 170 can again here be a passenger compartment. The interconnection device here comprises at least one antenna, which can be designed as an antenna array and comprises in each case at least two antenna elements. Such antennas can provide direction information by being able to form different antenna lobes. This can be done by means of adjustable delay elements assigned to each antenna element. The antennas can be arranged in the passenger compartment. It is also possible to arrange a plurality of antennas in the passenger compartment, which then improve the position-finding accuracy. In addition, the rest of the interconnection device can also be arranged in the passenger compartment or in the vehicle. It is also possible, however, for the interconnection device to be installed centrally, for example, on a server of the vehicle manufacturer.

Figure 5:
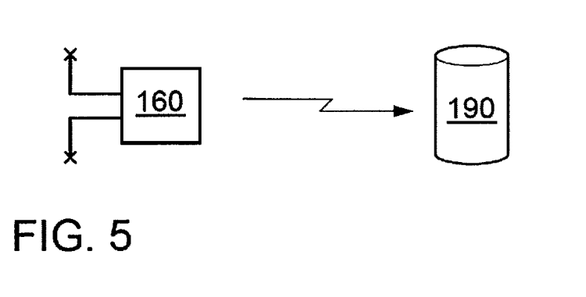
FIG. 5 shows another implementation of the first exemplary embodiment.

FIG. 5 shows another implementation of the first exemplary embodiment. This figure shows that data of the data transmission, also called user data, is stored in the interconnection device 160 and/or in a control center 190 assigned to the interconnection device. In the aforementioned case of message transmission for utility vehicles, it can be beneficial to save centrally the data stored by the first mobile station. For this purpose, the interconnection device can be connected to a server of the vehicle manufacturer by means of known mobile communications techniques such as GSM (global system for mobile communications), for instance. The control center makes the message available again when the second mobile station retrieves the message. Thus it is possible to guard against a temporary failure of the interconnection device, for example, during a repair and the unauthorized access of a third party.

Figure 6:
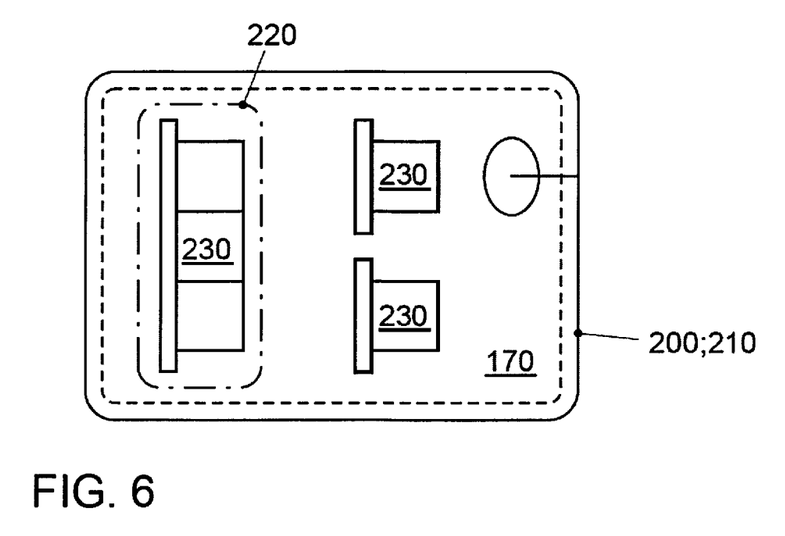
FIG. 6 shows another implementation of the first exemplary embodiment.

FIG. 6 shows another implementation of the first exemplary embodiment. In this case, the movable spatial region 170 can comprise a passenger compartment 200 of a vehicle or a cabin 210 of an aircraft. The localized zone 220 of the movable spatial region 170 can comprise seats or seat areas 230 in the passenger compartment 200 or in the cabin 210. The position of these seats or seat areas in the passenger compartment is known and can be used additionally for determining the position of the mobile stations. Passenger compartments of vehicles and cabins of aircraft are normally continuous spaces, at least for electromagnetic waves. Such passenger compartments and cabins may be equipped with infotainment systems or WLAN hotspots, to which the mobile stations can be connected. The interconnection can thus be performed with the involvement of the entertainment systems or WLAN hotspots. In addition, the field strength of the transmitted radio signals can be measured by means of suitable arrangements of antenna arrays. It is hence possible to determine the presence of mobile stations in the movable spatial region 170 and in the localized zone 220.

Figure 7:
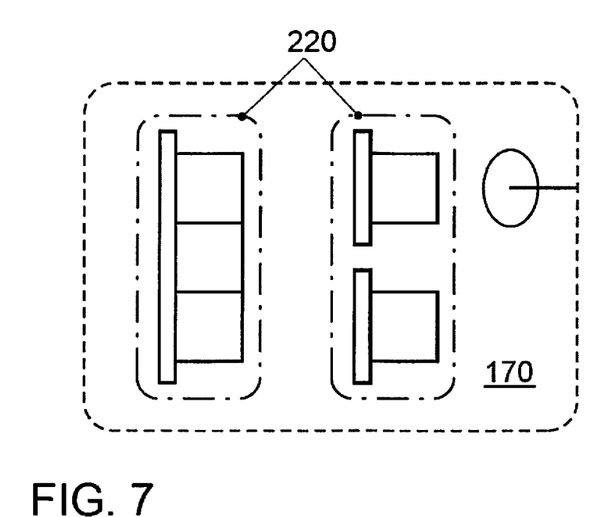
FIG. 7 shows another implementation of the first exemplary embodiment.

FIG. 7 shows another implementation of the first exemplary embodiment. It differs from FIG. 6 in the number of localized zones 220 within the movable spatial region 170. The figure shows two localized zones 220 by way of example. A first localized zone 220 here comprises the front seats in a passenger compartment. A second localized zone 220 comprises the rear seats. Thus, for instance, driver and front-seat passenger can be supplied with route information in the first localized zone 220, whereas in the second localized zone 220, the fellow passengers can play a game together. As already mentioned, these zones can also overlap, with the result that the front-seat passenger can belong to both localized zones 220 (not shown), for example.

Figure 8:
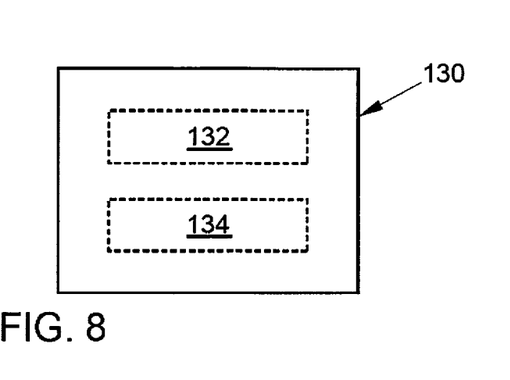
FIG. 8 shows another implementation using two options of the first exemplary embodiment.

FIG. 8 shows another implementation of the first exemplary embodiment. This figure shows a sketch of an optional form of the interconnection 130. The procedure 132 shows that the interconnection is activated without confirmation or by manual confirmation. Manual confirmation prevents the user of the mobile station from becoming a member of a group without his knowledge or agreement. The decision as to whether such a request is made can be stored, for example, in the mobile station or in the interconnection device. It can also comprise a list of mobile stations for which an interconnection confirmation is always required. It can also comprise another list of mobile stations for which an interconnection confirmation is never required.

Figure 9:
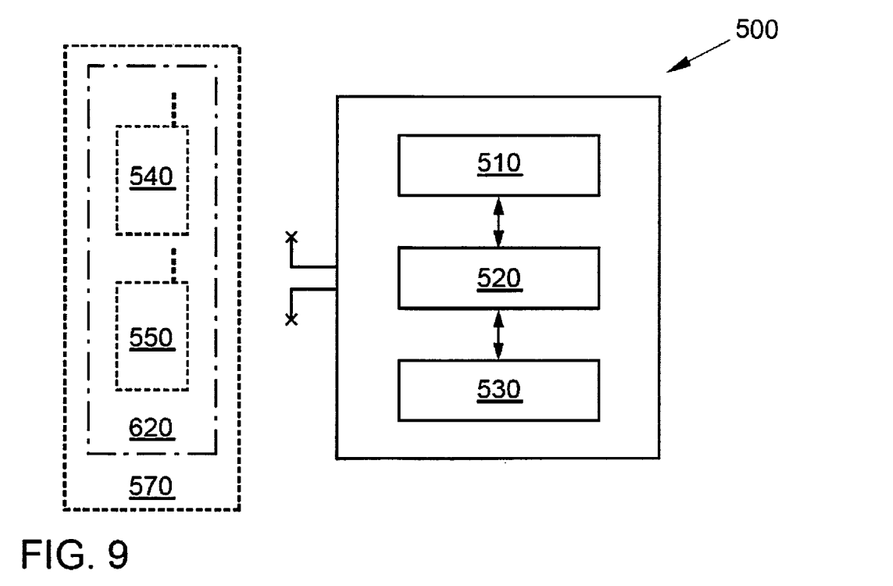
FIG. 9 shows a device of another exemplary embodiment.

FIG. 9 shows a device of another exemplary embodiment. It shows a device for data transmission 500 between at least two mobile stations 540 and 550 over an air interface. The device comprises an identification processor 510, which is designed to identify at least two mobile stations that are present within a movable spatial region 570. Connections to infotainment systems can be used for this purpose if the movable spatial region is a passenger compartment, for example. Alternatively or additionally, position data from the vehicle and the mobile stations can be used, for instance GPS (global positioning system) data, which is often acquired in commercially available mobile stations. The mobile stations identified in this way are notified to a verification processor 520, which is designed to verify whether the at least two mobile stations are located within a localized zone 620 of the movable spatial region 570. This can be done by the aforementioned field strength measurement using the antenna arrays. Then the data from the mobile stations is transferred to an interconnection processor 530, which is designed to interconnect the at least two mobile stations 540 and 550 for the purpose of data transmission if the position of the at least two mobile stations 540 and 550 lies within the localized zone 620 of the moveable spatial region 570. A group in which user data can be exchanged can be formed by means of the interconnection.

Figure 10:
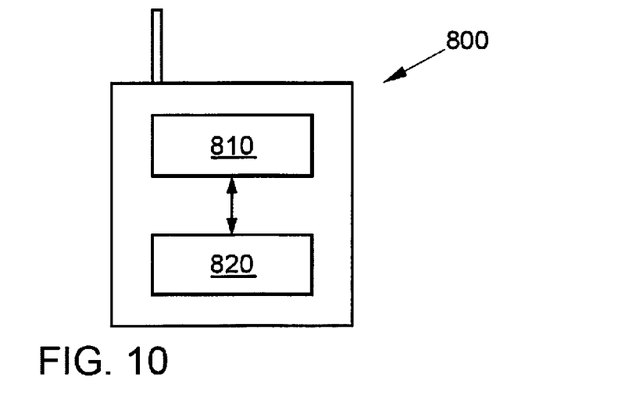
FIG. 10 shows another device of another exemplary embodiment.

FIG. 10 shows another device of another exemplary embodiment, which may be a mobile station 800. In this exemplary embodiment, the mobile station 800 is designed to connect to the at least one second mobile station over an air interface by means of an interconnection device. It contains an application processor 810, which is designed to communicate with the interconnection device for acquiring the position of the mobile station. The position can be acquired using the aforementioned interconnection to the interconnection device and/or using GPS, as already described. The mobile station 800 also contains an interconnection processor 820, which is connected to the application processor 810. The interconnection processor is designed for data transmission with a second mobile station in the event that the positions of the at least two mobile stations lie within a localized zone of a moveable spatial region. If the interconnection processor 820 is notified of the interconnection to the second mobile station, the interconnection processor permits and operates the data transmission with the interconnected mobile station using one or more of the radio transmissions described.

Exemplary embodiments can be summarized as follows: an increasing number of mobile devices may be present in a vehicle, which devices can be connected to the vehicle electronics, for instance by means of Bluetooth or other radio signals. The vehicle is a region characterized by two types of information, thereby establishing privacy:

The vehicle electronics know the movements of the vehicle and its position. It is highly unlikely that devices remain connected to the vehicle during the journey if they are not inside the vehicle.

The vehicle electronics can also locate the position of signals in the interior and find the position of the mobile devices more accurately relative to one another. The reference system is in this case the vehicle interior.

If these two conditions are combined, then groups can be formed spontaneously that are identified as belonging together from their position in the vehicle. By specifying the position-finding range (for instance the entire interior versus just the central console) it is possible to define a region in which mobile devices are identified as a group and in addition are allowed to communicate further with one another subsequently.

The users can decide to enter this automatically formed group either always or on prompting. A typical example of the use of such a vehicle group is taking travel photos or videos, which are shared with all the group members.

Groups of devices can be generated reliably automatically by means of identical motion statistics (all are moving synchronously relative to the stationary environment, all are located in a defined region inside the vehicle).

By finding the position of the mobile devices in the vehicle, the vehicle can allocate position-dependent permissions to the devices in the group, for instance can allocate transmit permissions for all the devices that are not located in the driver's seat during travel. This can be achieved, for instance, by the vehicle acting as an access point, and all information, including between the devices in the vehicle, thereby being routed via the vehicle infrastructure.

At least one exemplary embodiment uses an application on the mobile devices (VW Connect), to which a user logs in, and in which a user can also configure his preferences (for instance whether automatic groups are allowed). VW Connect communicates with the vehicle and receives from the vehicle the configuration of new groups.

Groups can be assigned an automatic expiry date to avoid having to manage a continually growing number of groups. In addition, existing groups can be confirmed and strengthened by reinforcement learning if such groups are repeatedly being formed.

In the field of fleet management, another function of automatic group formation can be relevant: drivers of utility for vehicles may wish to leave messages for their replacements, who they may not know by name, concerning the vehicle or details of a job. They can leave this information in the virtual space of the vehicle (i.e., in the vehicle or even in the representation of the vehicle in a backend (server)) once they have been added automatically to the vehicle groups. The next driver can then receive this information once he has been added automatically by his mobile device to the vehicle groups. Again in this case, pinpointing the position is important that only the driver receives this information (using his mobile device in the driver's seat).

Automatic group-formation is more likely to find acceptance in the private personal domain, where it offers obvious simplification to communications.

The features disclosed in the above description, in the following claims and in the accompanying figures may be relevant, and can be implemented, both individually and in any combination for realizing an exemplary embodiment in its various forms.

Although some embodiments have been described in connection with a device, these obviously also constitute a description of the corresponding method, and therefore a block or a component of a device can also be understood in the sense of a corresponding method operation or a feature of a method operation. Likewise, embodiments that have been described in connection with a method operation or as a method operation also constitute a description of a corresponding block or detail or feature of a corresponding device.

A programmable hardware component can be formed by a processor, a central processing unit (CPU), a graphics processing unit (GPU), a computer, a computer system, an application-specific integrated circuit (ASIC), an integrated circuit (IC), a system on chip (SOC), a programmable logic element or a field programmable gate array (FPGA).

In general, exemplary embodiments can be implemented as software, firmware, a computer program or a computer program product containing a program code or as data, which program code or data has the effect of implementing one of the methods when the program is executed on a processor or on a programmable hardware component. The program code or the data can be stored on a machine-readable medium or data storage medium, for example. The program code or the data can exist inter alia as source code, machine code or bytecode or any other intermediate code.

According to at least one exemplary embodiment, during its execution a program can implement one of the methods, for instance by reading memory locations or writing one or more items of data to the memory locations, thereby, if applicable, causing switching operations or other operations in transistor structures, in amplifier structures or in other electrical, optical or magnetic components or components working on the basis of another operating principle. Hence a program can acquire, determine or measure data, values, sensor values or other information by reading a memory location. Thus a program can acquire, determine or measure parameters, values, measured values and other information by reading one or more memory locations, and can produce, cause or perform an action and control other devices, machines and components by writing to one or more memory locations.

The exemplary embodiments described above merely illustrate the principles. Of course modifications and variations to the arrangements and details described here will be obvious to other persons skilled in the art. Thus the intention is that the disclosed embodiment should be limited by the scope of protection of the following claims and not by the specific details that have been presented in this document by the description and explanation of the exemplary embodiments.

LIST OF REFERENCES

100 method for data transmission
110 identification
120 verification
130 interconnection of the at least two mobile stations
132 manual confirmation
134 clearance operation
140 mobile station
150 mobile station
160 interconnection device
170 movable spatial region 180 vehicle
190 control center
200 passenger compartment
210 cabin
220 localized zone
230 seats, seat areas
500 device for data transmission
540 mobile station
550 mobile station
510 identification processor
520 identification processor
530 verification processor
570 movable spatial region
620 localized zone
800 mobile station
810 application processor
820 interconnection processor

The invention claimed is:

1. A method for data transmission between at least two mobile stations over an air interface, the method comprising:
identifying at least two mobile stations that are present within a moveable spatial region;
verifying whether the at least two mobile stations are located within a localized zone of the moveable spatial region; and
interconnecting, for the purpose of data transmission, the at least two mobile stations in response to the positions of the at least two mobile stations laying within the localized zone of the moveable spatial region,
wherein at least some of the data transmission takes place directly between the mobile stations based on the interconnecting and the at least two mobile stations being present within the moveable spatial region, and
wherein at least two localized zones are arranged within the movable spatial region, and each zone permits different data content transmission to occur between the at least two mobile stations depending on which of the two localized zones the at least two mobile stations are present in within the moveable spatial region.

2. The method of claim 1, wherein only one mobile station at a time is connected to an interconnection device.

3. The method of claim 1, wherein at least some of the data transmission takes place via an interconnection device assigned to the movable spatial region.

4. The method of claim 1, wherein an interconnection device is assigned to a vehicle.

5. The method of claim 1, wherein data of the data transmission is stored in an interconnection device and/or in a control center assigned to the interconnection device.

6. The method of claim 1, wherein the movable spatial region comprises a passenger compartment of a vehicle or comprises a cabin of an aircraft, and/or the localized zone of the movable spatial region comprises seats or seat areas in the passenger compartment or in the cabin.

7. The method of claim 1, wherein the interconnection is activated without confirmation or by manual confirmation.

8. The method of claim 1, wherein identification amongst the at least two mobile stations takes place immediately at the time of interconnection or not until a clearance operation.

9. The method of claim 1, wherein the interconnection period between the at least two mobile stations is linked to the presence of the at least two mobile stations within the localized zone of the movable spatial region and/or to an expiry date and/or to an evaluation of previous interconnections.

10. A computer program stored on a non-transitory storage medium for executing a method when implemented by a processor for data transmission between at least two mobile stations over an air interface, the method comprising:
identifying at least two mobile stations that are present within a moveable spatial region;
verifying whether the at least two mobile stations are located within a localized zone of the moveable spatial region; and
interconnecting, for the purpose of data transmission, the at least two mobile stations in response to the positions of the at least two mobile stations laying within the localized zone of the moveable spatial region,
wherein an interconnection period between the at least two mobile stations is dependent on the presence of the at least two mobile stations remaining within the localized zone of the movable spatial region.

11. A device for data transmission between at least two mobile stations over an air interface, the device comprising:
an identification processor to identify at least two mobile stations that are present within a movable spatial region;
a verification processor to verify whether the at least two mobile stations are located within a localized zone of the movable spatial region;
an interconnection processor to interconnect, for the purpose of data transmission, the at least two mobile stations when the positions of the at least two mobile stations lie within the localized zone of the moveable spatial region,
wherein at least some of the data transmission takes place directly between the mobile stations based on the interconnecting and the at least two mobile stations being present within the localized zone moveable spatial region, and
wherein an interconnection period between the at least two mobile stations is to the presence of the at least two mobile stations remaining within the localized zone of the movable spatial region.

12. A mobile station for connecting to at least one second mobile station over an air interface by an interconnection device, the mobile station comprising:
an application processor to communicate with the interconnection device for acquiring the position of the mobile station; and
an interconnection processor connected to the application processor for data transmission with a second mobile station in the event that the positions of the at least two mobile stations lie within a localized zone of a moveable spatial region,
wherein at least some of the data transmission takes place directly between the mobile stations based on the interconnecting and the at least two mobile stations being present within the localized zone of moveable spatial region, and
wherein an interconnection period between the at least two mobile stations is dependent on the presence of the at least two mobile stations remaining within the localized zone of the movable spatial region.

* * * * *